US00RE44797E

(19) United States
(12) Reissued Patent
Liljestrom et al.

(10) Patent Number: US RE44,797 E
(45) Date of Reissued Patent: Mar. 11, 2014

(54) APPARATUS, METHOD AND COMPUTER PROGRAM PRODUCT PROVIDING USER EQUIPMENT OPERATION BY CONSIDERING SCHEDULING INFORMATION WITH REGARD TO THE USE OF RELATIVE GRANTS

(75) Inventors: Henrik Liljestrom, Helsinki (FI); Benoist Sebire, Tokyo (JP)

(73) Assignee: Calton Research L.L.C., Wilmington, DE (US)

(21) Appl. No.: 13/440,893

(22) Filed: Apr. 5, 2012

Related U.S. Patent Documents

Reissue of:
(64) Patent No.: 7,693,156
Issued: Apr. 6, 2010
Appl. No.: 11/788,540
Filed: Apr. 19, 2007

U.S. Applications:
(60) Provisional application No. 60/793,429, filed on Apr. 19, 2006.

(51) Int. Cl.
*H04L 12/56* (2011.01)
*H04W 4/00* (2009.01)

(52) U.S. Cl.
USPC ..... 370/329; 370/462; 370/395.4

(58) Field of Classification Search
USPC ..... 370/318, 329, 462, 468
See application file for complete search history.

(56) References Cited

U.S. PATENT DOCUMENTS 7,480,269 B2 * 1/2009 Heo et al. ..... 370/328
7,551,625 B2 6/2009 Ahn et al.
8,081,595 B2 * 12/2011 Zhang et al. ..... 370/318
8,271,016 B2 * 9/2012 Kwak et al. ..... 455/522
2007/0025300 A1 2/2007 Terry et al.
2007/0042785 A1 2/2007 Nakamata
2007/0054652 A1 3/2007 Pan et al.
2007/0218907 A1 9/2007 Jiang
2007/0297360 A1 12/2007 Joachim et al.
2008/0214197 A1 9/2008 Englund et al.
2008/0273483 A1 11/2008 Zhang et al.

OTHER PUBLICATIONS

3GPP TS 25.309, V6.6.0 (Mar. 2006), 3rd Generation Partnership Project; Technical Specification Group Radio Access Network; FDD Enhanced Uplink; Overall description; Stage 2 (Release 6), 34 pgs.
3GPP TS 25.321, V7.0.0 (Mar. 2007), 3rd Generation Partnership Project; Technical Specification Group Radio Access Network; Medium Access Control (MAC) protocol specification (Release 7), 94 pgs.

* cited by examiner

*Primary Examiner* — Min Jung
(74) *Attorney, Agent, or Firm* — Stolowitz Ford Cowger LLP

(57) ABSTRACT

Disclosed is a method to operate a wireless user equipment, a wireless user equipment, a computer program product, and an apparatus. The method includes, in response to operation during a Baseline Procedure when no absolute grant (AG) is received from a wireless network node, determining if there was a scheduled transmission in a previous transmission time interval of a hybrid automatic repeat request (HARQ) process and, if there was, using a serving relative grant (SRG) and, if it is determined instead that there was not a scheduled transmission in the previous transmission time interval of the HARQ process, not using the SRG if it is determined that there was a scheduling information (SI) event alone in the previous transmission time interval of the HARQ process.

58 Claims, 2 Drawing Sheets

APPARATUS, METHOD AND COMPUTER PROGRAM PRODUCT PROVIDING USER EQUIPMENT OPERATION BY CONSIDERING SCHEDULING INFORMATION WITH REGARD TO THE USE OF RELATIVE GRANTS

Matter enclosed in heavy brackets [ ] appears in the original patent but forms no part of this reissue specification; matter printed in italics indicates the additions made by reissue.

CROSS REFERENCE TO RELATED APPLICATION

This application *is a reissue of U.S. patent application Ser. No. 11/788,540, filed Apr. 19, 2007, now issued as U.S. Pat. No. 7,693,156,* claims priority to U.S. Provisional Patent Application No. 60/793,429, filed on Apr. 19, 2006 and hereby [incorporated] *incorporate all* by reference in [its] *their* entirety, including exhibits.

TECHNICAL FIELD

The exemplary and non-limiting embodiments of this invention relate generally to wireless communication systems, apparatus and methods and, more specifically, relate to wireless communication system techniques for enabling the grant of uplink resources to user equipment.

BACKGROUND

The following abbreviations are defined as follows:

AG absolute grant
DCH dedicated channel
DL downlink (Node-B to UE)
DPDCH dedicated physical data channel
DPCCH dedicated physical control channel
E-AGCH E-DCH absolute grant channel
E-DCH enhanced uplink DCH
E-DPDCH enhanced DPDCH
E-DPCCH enhanced DPCCH
E-RNTI E-DCH radio network temporary identifier
E-RGCH E-DCH relative grant channel
HARQ hybrid automatic repeat request
HSUPA high speed uplink packet access
MAC medium access control
MAC-d MAC-dedicated transport channel
MAC-e MAC entity that handles the E-DCH
Node-B base station
RG relative grant
RLC radio link control
RLS radio link set
RNC radio network controller
RRC radio resource control
SG serving grant
SI scheduling information
TFC transport format combination
TTI transmission timing interval
UE user equipment, a mobile terminal
UL uplink (UE to Node-B)

Of interest herein is the uplink DCH (EDCH) for packet data traffic in, for example, Release 6 of 3 GPP TS 25.309, 3rd Generation Partnership Project; Technical Specification Group Radio Access Network; FDD Enhanced Uplink; Overall Description; Stage 2 (Release 6), which is attached to the incorporated provisional patent application as Exhibit A.

In HSUPA, certain attempts at enhancements are currently approached by distributing some of the packet scheduler functionality to the Node-Bs to provide faster scheduling of bursty, non-real-time traffic than can be provided by the Layer 3 (L3, Network Layer) of the RNC. The idea is that with faster link adaptation it is possible to more efficiently share the uplink power resource between packet data users, as when packets have been transmitted from one user the scheduled resource can be made available immediately to another user. This technique attempts to avoid the peaked variability of noise rise, such as when high data rates are being allocated to users that are running bursty, high data-rate applications.

In the current architecture, the packet scheduler is located in the RNC and therefore is limited in its ability to adapt to the instantaneous traffic, because of bandwidth constraints on the RRC signaling interface between the RNC and the UE. Hence, to accommodate the variability, the packet scheduler must be conservative in allocating uplink power to take into account the influence from inactive users in the following scheduling period. This solution can be spectrally inefficient for high allocated data-rates and long release timer values.

Thus, with E-DCH much of the packet scheduler functionality is transferred to the Node-B, i.e., there is a Node-B scheduler that is responsible for allocating uplink resources.

For transmission of data, the UE selects a TFC that suits the amount of data to be transmitted in a RLC buffer of the UE, subject to constraints on the maximum transmission power of the UE and the maximum power allowed by the Node-B scheduler.

As is currently described in subclause 3.1.2 of 3GPP TS 25.321, V6.8.0 (2006-03), "Medium Access Control (MAC) protocol specification" (attached to the incorporated provisional patent application in its entirety as Exhibit B), the state variable Serving_Grant indicates the maximum E-DPDCH to DPCCH power ratio that the UE 10 is allowed to use for scheduled data in the following transmission. The value in the appropriate state variable is provided to an E-TFC selection function to help in selecting the best format for the upcoming transmission. Possible values are: "Zero_Grant" and numerical values.

For efficient Node-B scheduling, some information is required from the UE, including the UE buffer status (e.g. how full it is), power status (e.g., how much power remains), and priority information regarding MAC-d flows or logical channels that are being used. All of this information is collectively referred to as the SI and is carried in the UL. Based on the SI, the Node-B decides whether to grant or not grant additional resources by responding with (data) rate grant messages in DL serving relative grant (RG) messages or absolute grant (AG) messages.

More specifically, 3GPP TS 25.321 defines UL Scheduling Information in subclause 9.2.5.3 as follows.

The Scheduling Information is located at the end of the MAC-e PDU and is used to provide the serving Node-B with a better view of the amount of system resources needed by the UE and the amount of resources it can actually make use of. The transmission of this information will be initiated due to the quantization of the transport block sizes that can be supported or based on the triggers defined in subclause 11.8.1.6. When a Scheduling Information is transmitted, its contents shall always be updated in new transmissions with the buffer status after application of the E-TFC selection procedure described in subclause 11.8.1.4. The logical channels for which a non-scheduled grant is configured shall never be taken into account when putting together this information. In addition, the RRC may restrict applicability for logical channels for which no non-scheduled grant was configured.

This information includes the following fields:

Highest priority Logical channel ID (HLID): The HLID field identifies unambiguously the highest priority logical channel with available data. If multiple logical channels exist with the highest priority, the one corresponding to the highest buffer occupancy will be reported. The length of the HLID is 4 bits. In case the TEBS is indicating index 0 (0 byte), the HLID shall indicate the value "0000".

Fields related to amount of available data:

Total E-DCH Buffer Status (TEBS): The TEBS field identifies the total amount of data available across all logical channels for which reporting has been requested by the RRC and indicates the amount of data in number of bytes that is available for transmission and retransmission in RLC layer. When MAC is connected to an AM RLC entity, control PDUs to be transmitted and RLC PDUs outside the RLC Tx window shall also be included in the TEBS. RLC PDUs that have been transmitted but not negatively acknowledged by the peer entity shall not be included in the TEBS.

The length of this field is 5 bits. The values taken by TEBS are shown in Table 9.2.5.3.2.1.

Highest priority Logical channel Buffer Status (HLBS): The HLBS field indicates the amount of data available from the logical channel identified by HLID, relative to the highest value of the buffer size range reported by TEBS when the reported TEBS index is not 31, and relative to 50000 bytes when the reported TEBS index is 31. The length of HLBS is 4 bits. The values taken by HLBS are shown in table 9.2.5.3.2.2. In case the TEBS field is indicating index 0 (0 byte), the HLBS field shall indicate index 0.

UE Power Headroom (UPH): The UPH field indicates the ratio of the maximum UE transmission power and the corresponding DPCCH code power defined in 3GPP TS 25.215 "Physical Layer-Measurements (FDD)". The length of UPH is 5 bits.

As is currently described in 3GPP TS 25.321 the serving RG messages are taken into account by the UE if there was a scheduled transmission in the previous TTI of the HARQ process. This specified procedure does not address a transmission in the previous TTI where there was SI only.

SUMMARY

The foregoing and other problems are overcome by the use of the exemplary embodiments of this invention.

In an aspect the exemplary embodiments of this invention provide a method, a computer program product and a device operable, in response to operation during a baseline procedure when no absolute grant is received from a wireless network node, to determine if there was a scheduled transmission in a previous transmission time interval of a hybrid automatic repeat request process and, if there was, to use a serving relative grant; and if it is determined instead that there was not a scheduled transmission in the previous transmission time interval of the hybrid automatic repeat request process, to not use the serving relative grant if it is determined that there was a scheduling information event alone in the previous transmission time interval of the hybrid automatic repeat request process.

In accordance with another embodiment is a method to operate a wireless user equipment. In this method, in response to operation during a baseline procedure when no absolute grant is received from a wireless network node, it is determined if there was a scheduled transmission in a previous transmission time interval of a hybrid automatic repeat request process and, if there was, using a serving relative grant. Also, if it is determined instead that there was not a scheduled transmission in the previous transmission time interval of the hybrid automatic repeat request process, the serving relative grant is used if it is determined that there was a scheduling information event in the previous transmission time interval of the hybrid automatic repeat request process.

In accordance with another embodiment of the invention is a computer program product embodied in a computer readable medium and comprising instructions the execution of which by a data processor of a wireless user equipment results in performing operations that include, in response to operation during a baseline procedure when no absolute grant is received from a wireless network node, determining if there was a scheduled transmission in a previous transmission time interval of a hybrid automatic repeat request process. If it is determined that there was, then a serving relative grant is used. If it is determined instead that there was not a scheduled transmission in the previous transmission time interval of the hybrid automatic repeat request process, then the serving relative grant is used if it is determined that there was a scheduling information event in the previous transmission time interval of the hybrid automatic repeat request process.

In yet another embodiment of the invention is a wireless user equipment that includes a wireless transceiver for communication with a wireless network node. Coupled to the wireless transceiver is a means, responsive to operation during a baseline procedure when no absolute grant is received from the wireless network node, for using a serving relative grant after determining: (a) that there was a scheduled transmission in a previous transmission time interval of a hybrid automatic repeat request process; or, if there was not a scheduled transmission in the previous transmission time interval of the hybrid automatic repeat request process, (b) that there was a scheduling information event in the previous transmission time interval of the hybrid automatic repeat request process.

These and other aspects are detailed further below and with reference to the drawings.

DETAILED DESCRIPTION

Figure 1:
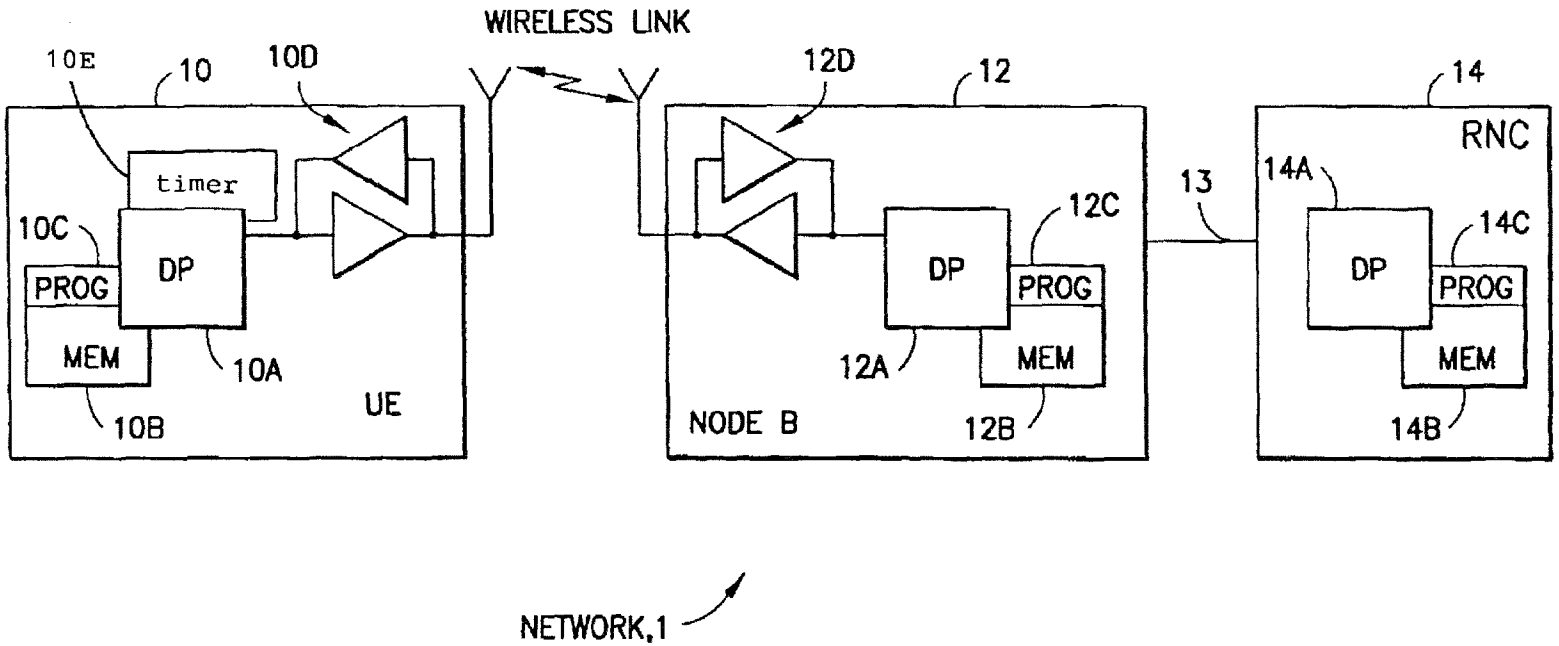
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1 a wireless network 1 is adapted for communication with a UE 10 via a Node-B (base station) 12. The network 1 may include a RNC 14, which may be referred to as a serving RNC (SRNC). The UE 10 includes a data processor (DP) 10A, a memory (MEM) 10B that stores a program (PROG) 10C, and a suitable radio frequency (RF) transceiver 10D for bidirectional wireless communications with the Node-B 12, which also includes a DP 12A, a MEM 12B that stores a PROG 12C, and a suitable RF transceiver 12D. The Node-B 12 is coupled via a data path 13 to the RNC 14 that also includes a DP 14A and a MEM 14B storing an associated PROG 14C. The RNC 14 may be coupled to another RNC (not shown). As illustrated, it may be assumed that the Node-B includes a Packet Scheduler (PS) function 12D. At least the PROG 10C is assumed to include program instructions that, when executed by the associated DP, enable the electronic device to operate in accordance with the exemplary embodiments of this invention, as will be discussed below in greater detail.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by the DP 10A of the UE 10 and the other DPs, or by hardware, or by a combination of software and hardware.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

In accordance with the exemplary embodiments of this invention, the problems discussed previously are overcome by providing that when the SI is sent alone (i.e., without scheduled data), the SI is used as a reference for disregarding the serving RG. That is, the serving RG are made inapplicable for those cases where only the SI was sent by the UE 10 in the previous TTI of the process.

As is presently provided for in 3GPP TS 25.321 in Clause 11.8, entitled Control of E-DCH transmission and reception, Subclause 11.8.1, entitled UE operation, subclause 11.8.1.3, entitled Serving Grant Update, and more specifically in subclause 11.8.1.3.1, entitled Baseline Procedure:

The Serving Grant Update procedure shall be applied at every TTI boundary and shall take into account the Absolute Grant message, Serving Relative Grant and non-serving Relative Grants that apply to the TTI.

The UE shall:

---

1> set reference_ETPR to the E-DPDCH to DPCCH power ratio as defined in subclause 3.1.2;
1> if an Absolute Grant was received for this TTI:
  2> if the Identity type is "Primary", and the Absolute Grant value is set to "INACTIVE":
    3> if Absolute Grant Scope indicates "Per HARQ process" and a 2 ms TTI is configured:
      4> de-activate the process given by the value of CURRENT_HARQ_PROCESS.
    3> if Absolute Grant Scope indicates "All HARQ processes" and a secondary E-RNTI was configured by higher layers:
      4> activate all HARQ processes;
      4> set Serving_Grant = Stored_Secondary_Grant;
      4> set Primary_Grant_Available to "False".
    3> if Absolute Grant Scope indicates "All HARQ processes", a 2 ms TTI is configured and a secondary E-RNTI was not configured by higher layers:
      4> deactivate all HARQ processes (if a process was inactive it remains inactive, if a process was active it becomes inactive).
  2> else if the Absolute Grant Value is different from "INACTIVE":
    3> if the Identity Type is "Secondary":
      4> set Stored_Secondary_Grant = Absolute Grant Value.
    3> if the Identity Type is "Primary" or Primary_Grant_Available is set to "False":
      4> set Serving_Grant = Absolute Grant Value.
      4> if the Identity Type is "Primary":
        5> set Primary_Grant_Available to "True";
        5> if Absolute Grant Scope indicates "Per HARQ process":
          6> activate the process given by the value of CURRENT_HARQ_PROCESS.
        5> if Absolute Grant Scope indicates "All HARQ processes":
          6> activate all HARQ processes.
        5> if AG _Timer is not active, it shall be started, otherwise it shall be restarted.
1> else (no Absolute Grant received):
  2> if the HARQ process given by the value of CURRENT_HARQ_PROCESS is active; and
  2> if Primary_Grant_Available is equal to "True"; and
  2> if Serving_Grant < > "Zero_Grant" ; and
  2> if AG_Timer has expired; and
  2> if there was a scheduled transmission in the previous TTf of the HARQ process given by the value of CURRENT_HARQ_PROCESS:
    3> if the Serving Relative Grant indicates "UP":
      4> determine the Serving_Grant in accordance with subclause 9.2.5.2.1.
    3> else, if the Serving Relative Grant indicates "DOWN":
      4> determine the Serving_Grant in accordance with subclause 9.2.5.2.1.
1> if any Non-Serving Relative Grants indicate "DOWN" for this TTI and -continued

```
Serving_Grant < > "Zero_Grant":
    2>    Serving_Grant = MIN(Serving_Grant, Serving_Grant determined in
    accordance with subclause 9.2.5.2.1);
    2>    Maximum_Serving_Grant = Serving_Grant.
    2>    if Non_Serving_RG_Timer is not active it shall be started, otherwise it
    shall be restarted;
1>        else if no Non-Serving Relative Grants indicate "DOWN" for this TTI:
    2>    if Non_Serving_RG_Timer has not expired:
        3>Serving_Grant = MIN(Maximum_Serving_Grant, Serving_Grant).
```

The text above indicated in italic bold is the portion of subclause 11.8.1.3.1 of most concern to the exemplary embodiments of this invention.

Related to the portion of the foregoing that is of most interest to the exemplary embodiments of this invention, 3GPP TS 25.321 defines in subclause 3.1.2 the AG-Time as a timer (10E in FIG. 1 that is set to one HARQ RTT (40 ms in the case of 10 ms TTI, 16 ms in the case of 2 ms TTI) and the Primary_Grant_Available as a Boolean state variable indicating whether the UE's serving grant is only affected by Primary Absolute Grants and Relative Grants (i.e. not by Secondary Absolute Grants).

The referenced subclause 9.2.5.2.1 is directed to Relative Grants, and defines same as follows.

Serving Relative Grant: Transmitted on the downlink on the E-RGCH from all cells in the serving E-DCH RLS, the serving relative grant allows the Node-B scheduler to incrementally adjust the serving grant of UEs under its control. By definition, there can only be one serving relative grant command received at any one time. This indication can take three different values, "UP", "DOWN" or "HOLD".

Non-serving Relative Grant: Transmitted on downlink on the E-RGCH front a non-serving E-DCH RL, the non-serving relative grant allows neighboring Node-Bs to adjust the transmitted rate of UEs that are not under their control in order to avoid overload situations. By definition, there could be multiple non-serving relative grant commands received by MAC at any time. This indication can take two different values, "DOWN" or "HOLD".

It is no that the Absolute Grant is defined in subclause 9.2.5.2.2 as follows.

The absolute grant message is sent on downlink, on the configured E-AGCH, from the serving E-DCH cell and allows the Node-B scheduler to directly adjust the granted rate of UEs under its control. The E-AGCH is a shared channel that uses an E-RNTI specific CRC in order to address messages to specific users. The RRC may configure the MAC-e with two different E-RNTIs, one primary and one secondary. Based on the identity that is used, the following information will be conveyed implicitly when an absolute grant message is received:

Identity Type: This variable will take the value "Primary" or "Secondary" respectively based on whether the message was addressed to the primary or the secondary E-RNTI.

The absolute grant message itself includes multiple fields that are multiplexed together into 6 bits inside the MAC-e of the Node-B and then submitted to the physical layer for transmission on the E-AGCH. These fields are:

Absolute Grant Value: This field indicates the maximum E-DCH traffic to pilot ratio (E-DPDCH/DPCCH) that the UE is allowed to use in the next transmission. The length of the Absolute Grant Value field is 5 bits.

Absolute Grant Scope: This field indicates the applicability of the Absolute Grant. It can take two different values, "Per HARQ process" or "All HARQ processes", allowing to indicate whether the HARQ process activation/de-activation will affect one or all processes. The Absolute Grant Scope is encoded in 1 bit, When the E-DCH is configured with 10 ms TTI, only the value "All HARQ processes" is valid (see subclause 10). In case Identity Type is "Secondary", only the value "All HARQ processes" is valid in this version of the protocol.

In accordance with a first exemplary embodiment of this invention the emphasized portion of the Baseline Procedure of subclause 11.8.1.3.1, specifically:

```
2> if there was a scheduled transmission in the previous TTf of the HARQ
process given by the value of CURRENT_HARQ_PROCESS:
    3>  if the Serving Relative Grant indicates "UP":
        4>  determine the Serving_Grant in accordance with subclause
        9.2.5.2.1.
    3>  else, if the Serving Relative Grant indicates "DOWN":
        4>  determine the Serving_Grant in accordance with subclause
        9.2.5.2,1;
```

is modified as follows (only the modification is shown in bold italics):

```
2>    if there was a scheduled transmission but not a Scheduling
Information alone in the previous TTI of the IIARQ process given
by the value of CURRENT HARQ PROCESS:
    3>  if the Serving Relative Grant indicates "UP":
        4> determine the Serving_Grant in accordance with subclause
        9.2.5.2.1.
    3>  else, if the Serving Relative Grant indicates "DOWN":
        4>  determine the Serving_Grant in accordance with
        subclause 9.2.5.2.1.
```

In this case the presence of the Scheduling Information (alone) is used to exclude taking into account the serving RG by the UE 10.

In accordance with a second exemplary embodiment of this invention the emphasized portion of the Baseline Procedure of subclause 11.8.1.3.1 (again specifically):

```
2> if there was a scheduled transmission in the previous TTf of the HARQ
process given by the value of CURRENT_HARQ_PROCESS:
    3>  if the Serving Relative Grant indicates "UP":
        4>determine the Serving_Grant in accordance with subclause
        9.2.5.2.1.
    3>  else, if the Serving Relative Grant indicates "DOWN":
        4>  determine the Serving_Grant in accordance with
        subclause 9.2.5.2.1;
```

is modified as follows (only the modification is shown in bold italics):

2> if there was a scheduled transmission or a Scheduling Information without scheduled data in the previous TTI of the HARQ process given by the value of CURRENT_HARQ_PROCESS:
3> if the Serving Relative Grant indicates "UP":
4> determine the Serving_Grant in accordance with subclause 9.2.5.2.1.
3> else, if the Serving Relative Grant indicates "DOWN":
4> determine the Serving_Grant in accordance with subclause 9.2.5.2.1.

In this case the presence of the Scheduling Information without scheduled data is added as a trigger for taking into account the serving RG by the UE 10.

In accordance with these two exemplary embodiments the presence of Scheduling Information sent alone, and Scheduling Information, sent with non-scheduled data (and without scheduled data), may be used as a decision criteria for whether or not the UE 10 takes into account the serving RG, and thus whether the UE 10 is or is not required to revert to the use of the AG under these conditions.

Figure 2A:
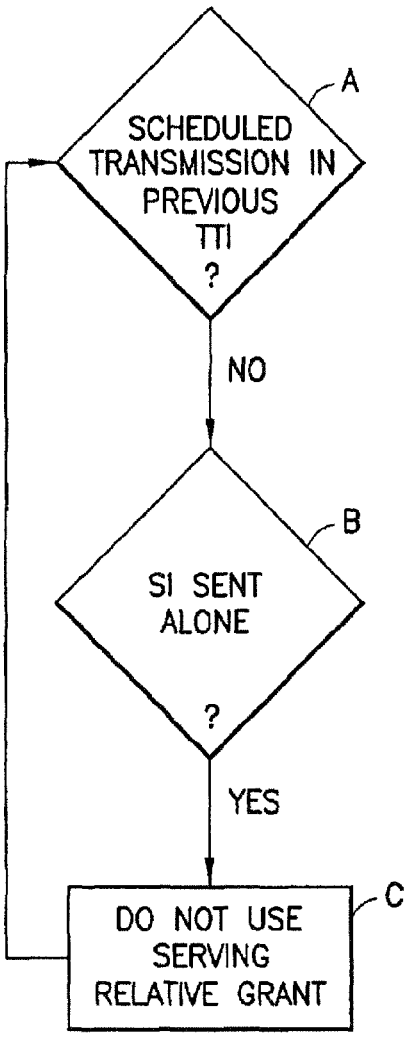
FIG. 2A is a logic flow diagram in accordance with one exemplary embodiment of this invention.
Figure 2B:
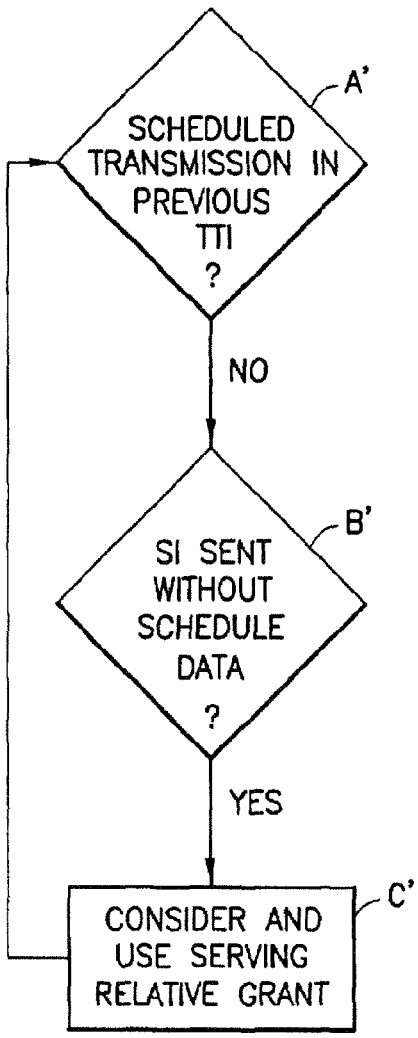
FIG. 2B is a logic flow diagram in accordance with another exemplary embodiment of this invention.

Referring to FIGS. 2A and 2B, which are logic flow diagrams illustrative of the two exemplary embodiments, a determination is made at FIG. 2A, when no Absolute Grant is received, it there was a scheduled transmission in the previous TTI of the HARQ process (Block A). If no, and if there was a SI alone (first exemplary embodiment) in the previous TTI of the HARQ process (Block B), then the Serving Relevant Grant is disregarded (Block C).

Referring to FIG. 2B, a determination is made, when no Absolute Grant is received, if there was a scheduled transmission in the previous TTI of the HARQ process (Block A), or if there was a SI with non-scheduled data and without scheduled data (second exemplary embodiment) in the previous TTI of the HARQ process (Block B), then the Serving Relevant Grant is considered (Block C).

A clear advantage of the use of the exemplary embodiments of the invention is that the usefulness of the RG signaling is maximized.

Based on the foregoing it should be apparent that the exemplary embodiments of this invention provide a method, apparatus and computer program product(s) to operate the UE 10 during a Baseline Procedure, when no Absolute Grant is received, to determine if there was a scheduled transmission in the previous TTI of the HARQ process or if there was a SI, alone or with non-scheduled data and without scheduled data, in the previous TTI of the HARQ process, and if so, to use the Serving Relevant Grant.

It is noted that it is within the scope of the exemplary embodiments of this invention to not allow the E-RGCH (i.e., for the UE 10 to not use the Serving Relative Grant) if a SI is sent alone by the UE 10

That is, it is within the scope of the exemplary embodiments of this invention to operate the UE 10 such that, in response to operation during a Baseline Procedure when no Absolute Grant is received from the wireless network node (e.g., from the Node-B), to determine if there was a scheduled transmission in a previous transmission time interval of a Hybrid Automatic Repeat Request process and, if there was, to use a Serving Relative Grant and, if it is determined instead that there was not a scheduled transmission in the previous transmission time interval of the Hybrid Automatic Repeat Request process, to not use the Serving Relative Grant if it is determined that there was a Scheduling Information event alone in the previous transmission time interval of the Hybrid Automatic Repeat Request process.

It is also within the scope of this invention to use the E-RGCH (i.e., for the UE 10 to use the Serving Relative Grant) if a SI is sent alone by the UE 10, or if SI is sent with unscheduled data by the US 10. Embodiments for this aspect may be a method, a computer program product, and a wireless user equipment as detailed above.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:

in response to operation during a baseline procedure when no absolute grant is received from a wireless network node, determining by a processor if there was a scheduled transmission in a previous transmission time interval of a hybrid automatic repeat request process and, if there was, using a serving relative grant; and if it is determined by the processor instead that there was not a scheduled transmission in the previous transmission time interval of the hybrid automatic repeat request process, not using the serving relative grant if it is determined that there was a scheduling information event alone in the previous transmission time interval of the hybrid automatic repeat request process.

2. The method of claim 1, wherein not using the serving relative grant comprises transmitting a next scheduled transmission in a subsequent transmission time interval at a power setting that is not modified by the serving relative grant.

3. The method of claim 2, wherein the power setting is not modified by the serving relative grant nor by a non-serving relative grant.

4. The method of claim 1 further comprising, for the case where it is determined by the processor that there was a scheduling information event alone in the previous transmission time interval:

determining a power grant for a dedicated physical data channel from a locally stored minimum grant value and a power on a dedicated physical control channel;

not modifying the determined power grant according to the serving relative grant; and transmitting a next scheduled transmission in a later transmission time interval of the hybrid automatic repeat request process using the determined power grant.

5. The method of claim 4 further comprising, for the case where it is determined by the processor that there was a scheduled transmission in the previous transmission time interval:

determining a power grant for a dedicated physical data channel from a locally stored minimum grant value and a power on a dedicated physical control channel;

modifying the determined power grant according to the serving relative grant; and transmitting a next scheduled transmission in a later transmission time interval of the hybrid automatic repeat request process using the modified determined power grant.

6. The method of claim 1, wherein the network node comprises a Node B and the method is executed by a wireless user equipment.

7. The method of claim 1, wherein the baseline process is part of a high speed uplink packet access protocol.

8. The method of claim 1, wherein no absolute grant is received due to expiration of a timer for an earlier received absolute grant.

9. A computer readable memory storing a program of computer readable instructions the execution of which by a data processor results in performing operations that comprise:

in response to operation during a Baseline Procedure when no Absolute Grant is received from a wireless network node, determining if there was a scheduled transmission in a previous transmission time interval of a Hybrid Automatic Repeat Request process and, if there was, using a Serving Relative Grant; and if it is determined instead that there was not a scheduled transmission in the previous transmission time interval of the Hybrid Automatic Repeat Request process, to not use the Serving Relative Grant if it is determined that there was a Scheduling Information event alone in the previous transmission time interval of the Hybrid Automatic Repeat Request process.

10. The computer readable memory of claim 9, wherein not using the serving relative grant comprises transmitting a next scheduled transmission in a subsequent transmission time interval at a power setting that is not modified by the serving relative grant.

11. The computer readable memory of claim 10, wherein the power setting is not modified by the serving relative grant nor by a non-serving relative grant.

12. The computer readable memory of claim 9, the operations further comprising, for the case where it is determined that there was a scheduling information event alone in the previous transmission time interval:

determining a power grant for a dedicated physical data channel from a locally stored minimum grant value and a power on a dedicated physical control channel;

not modifying the determined power grant according to the serving relative grant; and transmitting a next scheduled transmission in a later transmission time interval of the hybrid automatic repeat request process using the determined power grant.

13. The computer readable memory of claim 12, the operations further comprising, for the case where it is determined that there was a scheduled transmission in the previous transmission time interval:

determining a power grant for a dedicated physical data channel from a locally stored minimum grant value and a power on a dedicated physical control channel;

modifying the determined power grant according to the serving relative grant; and transmitting a next scheduled transmission in a later transmission time interval of the hybrid automatic repeat request process using the modified detennined power grant.

14. The computer readable memory of claim 9, wherein the data processor and the computer readable memory are disposed in the wireless user equipment.

15. The computer readable memory of claim 9, wherein the network node comprises a Node B.

16. The computer readable memory of claim 9, wherein the baseline process is part of a high speed uplink packet access protocol.

17. The computer readable memory of claim 9, wherein no absolute grant is received due to expiration of a timer for an earlier received absolute grant.

18. An apparatus, comprising a [processer] *processor* that is configured, responsive to operation during a Baseline Procedure when no Absolute Grant is received from the wireless network node, to use a Serving Relative Grant after determining that there was a scheduled transmission in a previous transmission time interval of a Hybrid Automatic Repeat Request process[;] and, if there was not a scheduled transmission in the previous transmission time interval of the Hybrid Automatic Repeat Request process and if there was a Scheduling Information event alone in the previous transmission time interval of the Hybrid Automatic Repeat Request process, [a processer that] *the processor* is configured to not use the Serving Relative Grant.

19. An apparatus of claim 18, wherein the [a processer] *processor* configured to not use *the* serving relative grant comprises the [processer] *processor* causing a transceiver of the apparatus to transmit a next scheduled transmission in a subsequent transmission time interval at a power setting that is not modified by the serving relative grant.

20. An apparatus of claim 19, wherein the power setting is not modified by the serving relative grant nor by a non-serving relative grant.

21. An apparatus of claim 18, wherein the baseline process is part of a high speed uplink packet access protocol.

22. An apparatus of claim 18, further comprising a timer and wherein no absolute grant is received due to expiration of the timer for an earlier received absolute grant.

23. The apparatus of claim 18, wherein the apparatus comprises a wireless user equipment.

24. An apparatus comprising:

means for storing a serving relative grant; *and*

[transceiving means for sending and receiving wireless messages; and]

[processing] means [responsive to operation, during a baseline procedure when no absolute grant is received from a wireless network node:] for using the serving relative grant after determining that there was a scheduled transmission [by the transceiving means] in a previous transmission time interval of a hybrid automatic repeat request process[; and], *wherein* if there was not a scheduled transmission [by the transceiving means] in the previous transmission time interval of the hybrid automatic repeat request process and if there was a scheduling information event alone sent [by the transceiving means] in the previous transmission time interval of the hybrid automatic repeat request process, *the means for using is configured* to not use the serving relative grant.

25. The apparatus of claim 24, wherein:

the means for storing comprises a memory; *and*

[the transceiving means comprises a wireless transceiver; and]

the [processing] means *for using* comprises a digital processor executing instructions tangibly embodied on the memory.

26. The apparatus of claim 24, wherein not using the serving relative grant comprises transmitting in a next subsequent transmission time interval at a power level unmodified by the serving relative grant.

27. A method, comprising:

in response to operation during a baseline procedure when no absolute grant is received from a wireless network node, determining, by *a* processor, if there was a scheduled transmission in a previous transmission time interval of a hybrid automatic repeat request process and, if there was, using a serving relative grant; and if it is determined by the processor instead that there was not a scheduled transmission in the previous transmission time interval of the hybrid automatic repeat request process, using the serving relative grant if it is determined that there was a scheduling information event in the previous transmission time interval of the hybrid automatic repeat request process.

28. The method of claim 27, where the scheduling information event occurred alone.

29. The method of claim 27, where the scheduling information event occurred with non-scheduled data and without scheduled data.

30. The method of claim 27, where the network node is comprised of a Node-B.

31. A computer readable memory storing a program of computer readable instructions the execution of which by a data processor of a wireless user equipment results in performing operations that comprise:

in response to operation during a baseline procedure when no absolute grant is received from a wireless network node, determining if there was a scheduled transmission in a previous transmission time interval of a hybrid automatic repeat request process and, if there was, using a serving relative grant; and if it is determined instead that there was not a scheduled transmission in the previous transmission time interval of the hybrid automatic repeat request process, using the serving relative grant if it is determined that there was a scheduling information event in the previous transmission time interval of the hybrid automatic repeat request process.

32. The computer [program product] *readable memory* of claim 31, where the scheduling information event occurred alone.

33. The computer [program product] *readable memory* of claim 31, where the scheduling information event occurred with non-scheduled data and without scheduled data.

34. The computer readable memory of claim 31, where the network node is comprised of a Node-B.

35. An apparatus, comprising a processor that is configured, responsive to operation during a baseline procedure when no absolute grant is received from the wireless network node, to use a serving relative grant after determining[: (a)] that there was a scheduled transmission in a previous transmission time interval of a hybrid automatic repeat request process[;], or, if there was not a scheduled transmission in the previous transmission time interval of the hybrid automatic repeat request process, [(b)] that there was a scheduling information event in the previous transmission time interval of the hybrid automatic repeat request process.

36. The apparatus of claim 35, where the scheduling information event occurred alone.

37. The apparatus of claim 35, where the scheduling information event occurred with non-scheduled data and without scheduled data.

38. The apparatus of claim 35, where the network node comprises a Node-B and the apparatus comprises a wireless user equipment.

*39. A device comprising:*

*a network interface configured to receive a serving relative grant from a base station; and*

*a processing device configured to determine whether to utilize the serving relative grant to adjust a data transmission rate by the device based on contents of a transmission from the network interface to the base station in a previous transmission time interval.*

*40. The device of claim 39, wherein the processing device is configured to ignore the serving relative grant based on the contents of the transmission.*

*41. The device of claim 40, wherein the contents of the transmission include scheduling information alone.*

*42. The device of claim 40, wherein the contents of the transmission include scheduling information and unscheduled data.*

*43. The device of claim 40, wherein the network interface is configured to transmit data in a subsequent transmission time interval at a same power level as the transmission in the previous transmission time interval.*

*44. The device of claim 39, wherein the processing device is configured to adjust the rate of data transmission by the network interface based on the serving relative grant.*

*45. The device of claim 44, wherein the contents of the transmission include scheduled data.*

*46. A method comprising:*

*receiving, by user equipment, a serving relative grant from a base station; and*

*determining, by the user equipment, whether to utilize the serving relative grant to adjust a data transmission rate of user equipment based on contents of a transmission by the user equipment to the base station in a previous transmission time interval.*

*47. The method of claim 46 further comprising ignoring, by the user equipment, the serving relative grant in response the determining.*

*48. The method of claim 47, wherein the contents of the transmission include scheduling information alone.*

*49. The method of claim 47, wherein the contents of the transmission include scheduling information and unscheduled data.*

*50. The method of claim 49, further comprising adjusting, by the user equipment, the data transmission rate of the user equipment based on the serving relative grant in response to the determining.*

*51. The method of claim 50, wherein the contents of the transmission include scheduled data.*

*52. The method of claim 47 further comprising transmitting, by the user equipment, data in a subsequent transmission time interval at a same power level as the transmission in the previous transmission time interval.*

*53. A method comprising:*

*identifying, by a processing device in user equipment, contents of a message transmitted in a first time interval by the user equipment to a base station; and*

*disregarding, by the processing device, a serving relative grant for a transmission during a second time interval based on the contents of the message.*

*54. The method of claim 53, wherein the contents of the message include scheduling information alone.*

*55. The method of claim 53, wherein the contents of the message include scheduling information and unscheduled data.*

*56. The method of claim 53 further comprising prompting, by the processing device, transmission of data during the second time interval with a same power level as the transmission of the message during the first time interval.*

*57. The method of claim 53, wherein the serving relative grant is configured to request adjustment of a data transmission rate of the user equipment.*

*58. The method of claim 53, wherein the serving relative grant is configured to request adjustment of a power level of data transmissions by the user equipment.*

* * * * *